(12) United States Patent
Durand et al.

(10) Patent No.: US 8,557,170 B2
(45) Date of Patent: Oct. 15, 2013

(54) PROCESS FOR THE MANUFACTURE OF NONWOVEN SURFACES

(75) Inventors: Roland Durand, Saint Bonnet de Mure (FR); Bertrand Bordes, Lyons (FR); Matthieu Helft, Oullins (FR); Caroll Vergelati, Saint Baudille de la Tour (FR)

(73) Assignee: Rhodia Operations, Aubervilliers (FR)

(*) Notice: Subject to any disclaimer, the term of this patent is extended or adjusted under 35 U.S.C. 154(b) by 1033 days.

(21) Appl. No.: 10/586,770

(22) PCT Filed: Jan. 20, 2005

(86) PCT No.: PCT/FR2005/000125
§ 371 (c)(1),
(2), (4) Date: Aug. 18, 2008

(87) PCT Pub. No.: WO2005/080471
PCT Pub. Date: Sep. 1, 2005

(65) Prior Publication Data
US 2008/0290553 A1 Nov. 27, 2008

(30) Foreign Application Priority Data

Jan. 22, 2004 (FR) .................................. 04 00606
Dec. 23, 2004 (FR) .................................. 04 13809

(51) Int. Cl.
*B29C 39/14* (2006.01)
(52) U.S. Cl.
USPC .......................................... 264/555; 264/255

(58) Field of Classification Search
USPC .................................................. 264/255, 555
See application file for complete search history.

(56) References Cited

U.S. PATENT DOCUMENTS

| 3,755,249 A | 8/1973 | Fujita et al. |
| 3,887,644 A | 6/1975 | Wells |
| 5,959,069 A * | 9/1999 | Gluck et al. .................. 528/332 |
| 2004/0242788 A1 | 12/2004 | La Grande et al. |

FOREIGN PATENT DOCUMENTS

| FR | 2248341 | 5/1975 |
| FR | 2500003 | 8/1982 |
| GB | 2093469 A | 9/1982 |
| WO | WO 94/23101 A1 | 10/1994 |
| WO | WO 03/002668 A1 | 1/2003 |

* cited by examiner

*Primary Examiner* — Yogendra Gupta
*Assistant Examiner* — John Robitaille
(74) *Attorney, Agent, or Firm* — Dentons US LLP

(57) ABSTRACT

The present invention relates to a novel process for the manufacture of nonwoven surfaces.

It relates more particularly to a process for the manufacture of nonwoven surfaces by the process of direct melt spinning of continuous filaments arranged in the form of a sheet. This process employs a composition based on a thermoplastic polymer exhibiting an electrical conductivity sufficient to prevent the formation of electrostatic charges or to allow their removal during the spinning process.

15 Claims, 1 Drawing Sheet

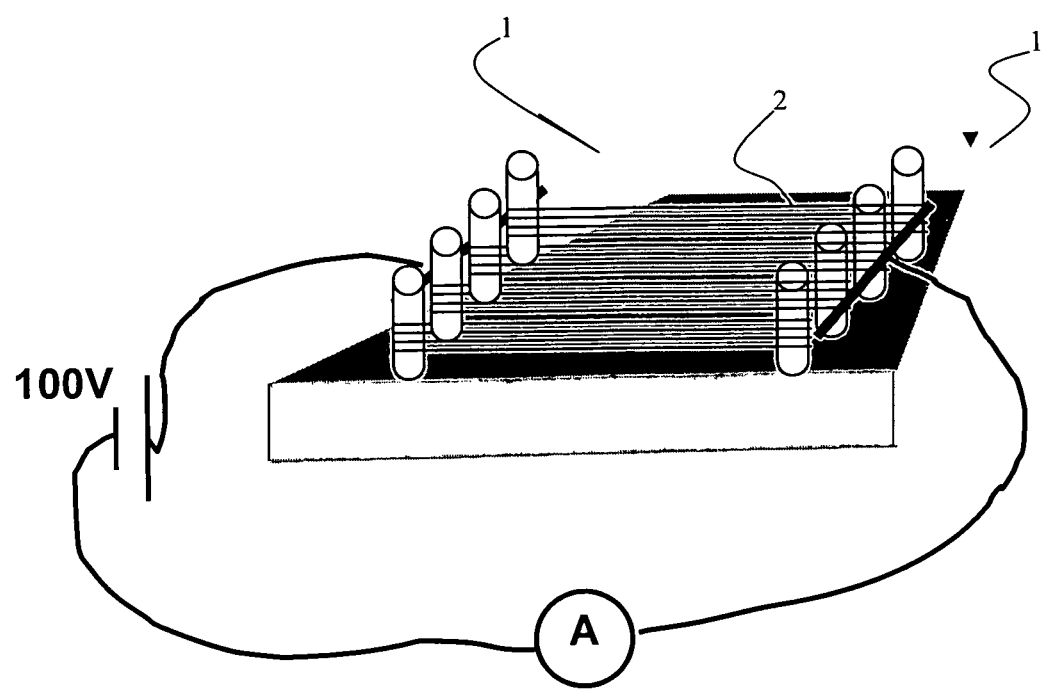

PROCESS FOR THE MANUFACTURE OF NONWOVEN SURFACES

This application is an application under 35 U.S.C. Section 371 of International Application Number PCT/FR2005/000125 filed on Jan. 20, 2005.

The present invention relates to a novel process for the manufacture of nonwoven surfaces.

It relates more particularly to a process for the manufacture of nonwoven surfaces by the process for the direct melt spinning of continuous filaments arranged in the form of a sheet.

Nonwoven surfaces are very widely used in numerous applications, such as the preparation of surface coatings, for example. These surfaces are obtained according to several processes, such as the wet process, which consists in suspending fibres in a liquid advantageously comprising a product which makes bonding possible. These fibres are collected on a collecting surface to produce a sheet which is calendered and dried to form the nonwoven surface.

Another process also used is referred to as the "dry-route process". This process consists in forming a sheet with cut and carded fibres formed into a web and then the sheet is treated to give it cohesion. By this dry route, it is also possible to manufacture sheets from continuous strands or filaments.

However, in the case of continuous strands or filaments, the most widely used process is the melt spinning process, referred to as the "direct spinning" process.

This process consists in extruding one or more polymers through one or more spinnerets to produce several filaments which will be attenuated by pneumatic means and deposited on a collecting surface to form a sheet. This sheet can be rendered cohesive according to various processes, such as impregnation by a resin or by thermo bonding. In this case, some filaments are manufactured from a polymer with a lower melting or softening point than those of the other filaments. Cohesion is then obtained by a heat treatment of the sheet.

To obtain a sheet exhibiting good properties and good homogeneity, it is essential, first, to obtain a uniform distribution of the continuous filaments over the collecting surface and, secondly, for the filaments deposited to exhibit homogeneous characteristics and properties.

In continuous direct spinning processes, it may be difficult to produce homogeneous continuous filaments or strands and a uniform distribution of the latter. This is because the individual filaments exiting from each spinneret hole are gathered together into a multifilament strand. This convergence of the filaments is brought about pneumatically. However, as is specified in U.S. Pat. No. 4,758,134, electrostatic charges are generated on the filaments, resulting in a dispersion of the latter and preventing the process from proceeding correctly. This patent, in order to limit the harmful effect of these electrostatic charges, provides for the operation to be carried out in a humid atmosphere. This solution also exhibits disadvantages, in particular when the polymers used are sensitive to moisture, such as, for example, polyamides.

One of the aims of the present invention is in particular to overcome these disadvantages by providing for the use of a composition based on thermoplastic polymers, the composition exhibiting electrically conducting properties which make it possible to prevent the disrupting effect of the electrostatic charges.

To this end, the present invention provides a process for the manufacture of nonwoven surfaces by direct melt spinning of filaments of a composition based on thermoplastic polymers comprising feeding the composition to a plurality of spinnerets each comprising several spinning orifices, then feeding the filaments obtained to a pneumatic attenuation device and a stage in which the attenuated continuous filaments are formed into a sheet, characterized in that the composition based on thermoplastic polymers fed to the spinnerets comprises a polymeric matrix and/or a modifying polymeric additive comprising repeat units corresponding to the following general formulae:

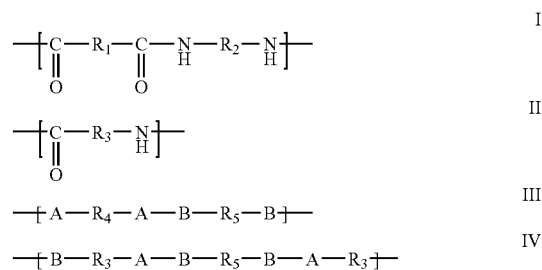

in which:

$R_1$, $R_2$, $R_3$ and $R_4$, which are identical or different, represent aliphatic, cycloaliphatic or aromatic hydrocarbon chains comprising from 2 to 18 carbon atoms, $R_5$ represents a polyether radical with a molecular weight of between 400 and 200 000, A and B represent the CO, NH or O group; when A represents CO, B represents NH or O and vice versa, and in that the polymeric matrix comprises at least one of the repeat units I or II and at least one of the repeat units III or IV when the modifying additive is absent or does not comprise repeat units of formula III or IV.

Advantageously, these compositions exhibit a volume electrical conductivity of greater than or equal to $1\times10^{-9}$ S/cm, preferably between $5\times10^{-9}$ S/cm and $5\times10^{-8}$ S/cm. However, compositions exhibiting a volume electrical conductivity different from the above range, for example less than $1\times10^{-9}$ S/cm, may also be suitable for the invention.

The process for the manufacture of the filaments can comprise feeding each filament to the pneumatic attenuation device or bringing together groups of filaments to form several multifilament strands which are fed to the pneumatic attenuation device and then positioned on a receiving surface to form a sheet.

As the filaments are made of an electrically conducting polymeric composition, the electrostatic charges generated at the surface of the filaments between the spinneret and the stage of forming into a sheet are very rapidly removed. Thus, the filaments remain parallel to one another and can be carried along throughout the device before the shaping into a sheet without dispersion and deviation from their path of forward progression. The compositions of the invention also make it possible to limit the formation of these electrostatic charges and thus to limit the effects of dispersion of the filaments or of adhesion of the latter to the metal walls of the device for spinning and preparing the sheet. The term "conducting polymer" or "conducting composition" should be understood as meaning polymers or compositions which exhibit a structure or components conferring a greater electrical conductivity than that of the unmodified polymers or compositions. However, the level of the conductivity remains low and makes possible in particular the removal of the electrostatic charges which may be formed during the forming of these polymers or compositions.

The thermoplastic polymers which are suitable for the invention are advantageously thermoplastic polymers belonging to the family of the polyamides and polyesters.

Mention may be made, as polyesters suitable for the process of the invention, of the conducting polyesters obtained by polymerization of diacid and diol monomers, the diols being composed of a mixture of alkylenediols, such as glycol, butanediol or propanediol, with a polyoxyalkylenediol.

Mention may be made, as thermoplastic polyamides suitable for in particular the first embodiment of the invention, of the copolyamides obtained by polymerization of conventional diacid, diamine or lactam monomers. However, monomers exhibiting a specific structure are added to the conventional monomers. These monomers advantageously exhibit ether bridges in their structure and are preferably compounds comprising a polyoxyalkylene chain and exhibiting terminal functional groups which react before the functional groups of the other monomers, such as, for example, amine, acid or hydroxyl functional groups.

Such compounds, comprising amine functional groups, are sold in particular by Huntsman under the name Jeffamines.

According to a first preferred embodiment of the invention, the thermoplastic polymer is advantageously a copolyamide comprising repeat units exhibiting polyoxyalkylene chains making it possible to obtain an increase in the electrical conductivity of conventional polyamides, such as polyamide 6,6 or polyamide 6.

Thus, the thermoplastic polymer of the first embodiment of the invention is a copolyamide comprising repeat units corresponding to the general formulae I or II and III or IV.

The repeat unit of formula I corresponds to the product of the polymerization reaction between a diacid chosen from the group consisting of succinic acid, adipic acid, terephthalic acid, isophthalic acid, decanedioic acid, dodecanedioic acid and their mixtures and a diamine chosen from the group consisting of hexamethylenediamine, 2-methylpentamethylenediamine, meta-xylylenediamine and their mixtures. This list does not have an exhaustive nature and other diacids or diamines may be used. The repeat unit of formula II corresponds to the polycondensation product of lactams or amino acids chosen from the group consisting of caprolactam, aminoundecanoic acid, aminododecanoic acid and their mixtures. Likewise, this list does not have an exhaustive nature and other lactams or amino acids may be used.

Advantageously, the concentration by weight of the repeat units of formula III and/or IV is between 0.5 and 5% by weight of the total of the repeat units or of the weight of the polymer.

Conducting polyamides corresponding to the above definition are disclosed, for example, in Patent Application WO 94/23101. These polyamides are obtained by using in particular lactams or amino acids, such as, for example, caprolactam, aminoundecanoic acid or aminododecanoic acid, as main and conventional monomer.

Conducting thermoplastic polyamides can also be obtained by polymerization of a diamine, such as hexamethylenediamine, with a diacid, such as adipic acid, in the presence or absence of a catalyst, according to conventional polymerization processes employed for the manufacture of polyamide 6,6, for example. According to the invention, the polyoxyalkylenediamine monomer is added to the polymerization medium either at the beginning, with the diamine or diacid monomers or the salt formed by the diacid and diamine monomers, or during the polymerization process, such as, for example, before or during the stage of placing the polymer under vacuum, in order to obtain the desired degree of polymerization.

In this first embodiment, the composition comprises, as predominant or sole component, the conducting thermoplastic polymer. Of course, the usual additives may be present, such as heat stabilizers, additives for improving the resistance of the polymer to ageing, such as UV stabilizers, pigments, dyes, mattifying agents, nucleating agents, or the like.

In a second embodiment of the invention, the composition based on thermoplastic polymer comprises a thermoplastic polymer and a modifying polymeric additive which makes it possible to improve the electrical conductivity of the composition. This additive comprises, in its structure, at least one polyoxyalkylene chain. This additive will be referred to in the continuation of the text as "conducting additive" for greater clarity and succinctness.

According to another characteristic of this second embodiment of the invention, the concentration of modifying polymeric additive in the composition is between 1% and 30% by weight with respect to the total composition weight, advantageously between 1% and 15% by weight.

According to another characteristic of the invention, the modifying polymeric additive exhibits a melt viscosity advantageously lower than that of the polymeric matrix. Thus, during the process of forming the composition, in particular during the melt spinning, the additive migrates to the surface of the strand. The surface properties of the strand are modified, in particular its electrical conductivity properties.

The compositions of this second embodiment of the invention are advantageously obtained by blending the thermoplastic polymer with the modifying polymeric additive and optionally other additives, such as those listed above. This blending can be carried out by any conventional process. One of the preferred processes is a blending of these components in an endless screw comprising one or more screws and extrusion through a spinneret to form a lace. This lace is subsequently cut up in order to produce granules with the desired size and the desired weight. These granules are used and fed, optionally after drying, to the plant for spinning and manufacturing nonwoven surfaces.

However, without departing from the scope of the invention, it is also possible to add the modifying polymeric additive, pure or in the form of a concentrated solution in a host polymer (masterbatch), to the molten thermoplastic polymer immediately before feeding to the spinneret for spinning the nonwoven.

According to a first alternative form, the modifying polymeric additive in accordance with the invention advantageously comprises a thermoplastic structure, preferably of similar nature to the structure of the thermoplastic polymer of the composition, and a structure comprising polyoxyalkylene chains. The thermoplastic structure can be a polyester or polyamide structure.

Mention may be made, as polyesters suitable as modifying polymeric additives for the process of the invention, of the copolyesters obtained by polymerization of diacid and diol monomers, the diols being composed of a mixture of alkylenediols, such as glycol, butanediol or propanediol, with a polyoxyalkylenediol.

Mention may be made, as polyamides suitable as modifying polymeric additives of the invention, of the copolyamides obtained by polymerization of conventional diacid, diamine or lactam monomers. However, monomers exhibiting a specific structure are added to the conventional monomers. These monomers advantageously exhibit ether bridges in their structure and are preferably compounds comprising a polyoxyalkylene chain and exhibiting terminal functional groups which react before the functional groups of the other monomers, such as, for example, amine, acid or hydroxyl functional groups.

Such compounds, comprising amine functional groups, are sold in particular by Huntsman under the name Jeffamines.

The conducting or modifying polymeric additive is obtained by polymerization of the monomers of following formulae:

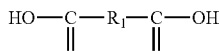 (V)

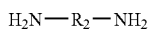 (VI)

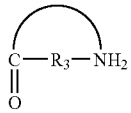 (VII)

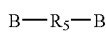 (VIII)

in which:
$R_1$, $R_2$ and $R_3$, which are identical or different, represent aliphatic, cycloaliphatic or aromatic hydrocarbon chains comprising from 2 to 18 carbon atoms, $R_5$ represents a polyether radical with a molecular weight of between 400 and 200 000, B represents the COOH, $NH_2$ or OH functional groups, in the presence of a monofunctional chain-limiting compound.

In order to control the melt viscosity of the additive and to limit its reactivity in the blend with the thermoplastic polymer, the polymerization is carried out in the presence of monofunctional compounds which limit the length of the chains according to known processes for the manufacture of polymers. Mention may be made, as monofunctional compounds, of monofunctional acids and monofunctional amines. Thus, acetic acid, propionic acid and benzylamine are preferred compounds.

Advantageously, the concentration by weight of the monomers of formula VIII in the mixture of monomers is between 1 and 20% by weight of all the monomers, advantageously between 1% and 10%.

Polyamides corresponding to the above definition are disclosed, for example, in Patent Application WO 94/23101. These polyamides are obtained by using in particular lactams or amino acids, such as, for example, caprolactam, aminoundecanoic acid or aminododecanoic acid, as main and conventional monomer.

In a second alternative form of the second embodiment of the invention, the modifying polymeric or conducting additive is advantageously a compound composed of:
at least one thermoplastic block and
at least one polyoxyalkylene block.
More specifically, this compound comprises:
at least one thermoplastic polymer block formed by:
a star or H macromolecular chain comprising at least one polyfunctional core and at least one branch or one segment of thermoplastic polymer connected to the core, the core comprising at least three identical reactive functional groups, and/or
a linear macromolecular chain comprising a difunctional core and at least one segment of thermoplastic polymer connected to the core, and
at least one polyoxyalkylene block connected to at least a portion of the reactive ends of the thermoplastic polymer block.

This conducting compound is disclosed in particular in International Patent Application WO 03/002668.

Thus, this compound comprises a thermoplastic polymer block and at least one polyoxyalkylene block:
the thermoplastic polymer block comprises:
a star or H macromolecular chain comprising at least one polyfunctional core and at least one branch or one segment of thermoplastic polymer connected to the core, the core comprising at least three identical reactive functional groups, and/or
a linear macromolecular chain comprising a difunctional core and at least one segment of thermoplastic polymer connected to the core,
the polyoxyalkylene block or blocks are connected to at least a portion of the free ends of the thermoplastic polymer block in the following way:
at least one free end of the star or H macromolecular chain, chosen from the thermoplastic polymer branch or segment ends and the ends of the polyfunctional core, is connected to a polyoxyalkylene block, and/or
at least one free end of the linear macromolecular chain, chosen from the thermoplastic polymer segments ends and the ends of the difunctional core, is connected to a polyoxyalkylene block; the two free ends of the linear macromolecular chain being connected to polyoxyalkylene blocks when the thermoplastic polymer block comprises macromolecular chains solely of linear type.

In a preferred embodiment, this compound has a star polyamide structure.

This star polyamide is obtained by copolymerization from a mixture of monomers comprising:
a) a polyfunctional compound comprising at least three identical reactive functional groups chosen from the amine functional group and the carboxylic acid functional group,
b) monomers of following general formulae (Xa) and/or (Xb):

$$X-R_{12}-Y \quad (Xa)$$

$$R_{12}-C\underset{NH}{\overset{O}{\diagup}} \quad (Xb)$$

c) if appropriate, monomers of following general formula (IX):

$$Z-R_6-Z \quad (IX)$$

in which:
Z represents a functional group identical to the reactive functional groups of the polyfunctional compound,
$R_{12}$ and $R_6$ represent identical or different, substituted or unsubstituted, aliphatic, cycloaliphatic or aromatic hydrocarbon radicals which comprise from 2 to 20 carbon atoms and which can comprise heteroatoms,
Y is a primary amine functional group when X represents a carboxylic acid functional group, or
Y is a carboxylic acid functional group when X represents a primary amine functional group.

The term "carboxylic acid" is understood to mean carboxylic acids and their derivatives, such as acid anhydrides, acid chlorides, esters, and the like. The term "amine" is understood to mean amines and their derivatives.

Processes for producing these star polyamides are disclosed in Patents FR 2 743 077 and FR 2 779 730. These processes result in the formation of star macromolecular chains, possibly as a mixture with linear macromolecular chains.

This star polyamide can also be obtained by melt blending, for example in an endless screw blending system, a polyamide of the type of those obtained by polymerization of lactams and/or amino acids and a polyfunctional compound comprising at least three identical reactive functional groups chosen from the amine or carboxylic acid functional group. The polyamide is, for example, polyamide 6.

Such preparation processes are disclosed in Patents EP 0 682 070 and EP 0 672 703.

The polyfunctional compounds which are the monomers at the source of the star or H macromolecular chains of the first subject-matter of the invention can be chosen from compounds exhibiting an arborescent or dendritic structure. They can also be chosen from the compounds represented by the formula (XI):

(XI)

in which:

$R_{11}$ is an aromatic or aliphatic, linear or cyclic, hydrocarbon radical comprising at least two carbon atoms which can comprise heteroatoms, Q is a covalent bond or an aliphatic hydrocarbon radical comprising from 1 to 6 carbon atoms, $Z_1$ represents a primary amine radical or a carboxylic acid radical, m is an integer between 3 and 8.

According to a specific characteristic of the invention, the $R_{11}$ radical is either a cycloaliphatic radical, such as the tetravalent cyclohexanonyl radical, or a 1,1,1-propanetriyl or 1,2,3-propanetriyl radical.

Mention may be made, as other $R_{11}$ radicals suitable for the invention, by way of examples, of substituted or unsubstituted trivalent phenyl and cyclohexanyl radicals, tetravalent diaminopolymethylene radicals with a number of methylene groups advantageously of between 2 and 12, such as the radical originating from EDTA (ethylenediaminetetraacetic acid), octavalent cyclohexanonyl or cyclohexadinonyl radicals, and radicals originating from compounds resulting from the reaction of polyols, such as glycol, pentaerythritol, sorbitol or mannitol, with acrylonitrile.

The Q radical is preferably a methylene or polymethylene radical, such as the ethylene, propylene or butylene radicals, or a polyoxyalkylene radical, such as the polyoxyethylene radical.

According to a specific embodiment of the invention, the number m is greater than or equal to 3 and advantageously equal to 3 or 4.

The reactive functional group of the polyfunctional compound represented by the symbol $Z_1$ is a functional group capable of forming an amide functional group.

Mention may be made, as examples of polyfunctional compounds, of 2,2,6,6-tetra(β-carboxyethyl)cyclohexanone, diaminopropane-N,N,N',N'-tetraacetic acid of following formula:

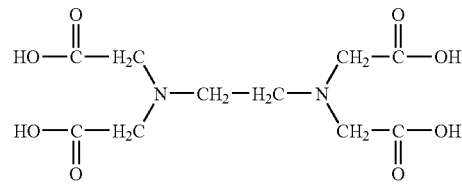 [SMILES: O=C(O)CN(CCN(CC(=O)O)CC(=O)O)CC(=O)O]

or the compounds originating from the reaction of trimethylolpropane or glycerol with propylene oxide and amination of the terminal hydroxyl groups. The latter compounds are sold under the trade name Jeffamines T® by Huntsman and have as general formula:

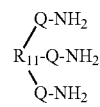

in which:

$R_{11}$ represents a 1,1,1-propanetriyl or 1,2,3-propanetriyl radical,

Q represents a polyoxyethylene radical.

Examples of polyfunctional compounds which may be suitable are mentioned in particular in U.S. Pat. No. 5,346,984, in U.S. Pat. No. 5,959,069, in Patent Application WO 96/35739 and in Patent EP 672 703.

Mention is made more particularly of nitrilotrialkylamines, in particular nitrilotriethylamine, dialkylenetriamines, in particular diethylenetriamine, trialkylenetetramines and tetraalkylenepentamines, the alkylene preferably being ethylene, and 4-aminoethyl-1,8-octanediamine.

Mention is also made of the dendrimers of formula:

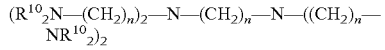

in which:

$R^{10}$ is a hydrogen atom or a —$(CH_2)_n$—$NR^7_2$ group where
$R^7$ is a hydrogen atom or a —$(CH_2)_n$—$NR^8_2$ group where
$R^8$ is a hydrogen atom or a —$(CH_2)_n$—$NR^9_2$ group where
$R^9$ is a hydrogen atom or a —$(CH_2)_n$—$NH_2$ group, n being an integer between 2 and 6, x being an integer between 2 and 14.

n is preferably an integer equal to 3 or 4, in particular 3, and x is preferably an integer between 2 and 6, limits included, preferably between 2 and 4, limits included, in particular equal to 2. Each $R^{10}$ radical can be chosen independently of the others. The $R^{10}$ radical is preferably a hydrogen atom or a —$(CH_2)_n$—$NH_2$ group.

Mention is also made of the polyfunctional compounds exhibiting 3 to 10 carboxylic acid groups, preferably 3 or 4 carboxylic acid groups. Preference is given, among these, to the compounds exhibiting an aromatic and/or heterocyclic ring, for example benzyl, naphthyl, anthryl, biphenyl and triphenyl radicals, or heterocycles, such as pyridine, bipyridine, pyrrole, indole, furan, thiophene, purine, quinoline, phenanthrene, porphyrin, phthalocyanine and naphthalocyanine. Preference is very particularly given to 3,5,3',5'-biphenyltetracarboxylic acid, acids derived from phthalocyanine and from naphthalocyanine, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, more particularly still trimesic acid and 1,2,4,5-benzenetetracarboxylic acid.

Mention is also made of polyfunctional compounds, the core of which is a heterocycle exhibiting a point of symmetry, such as 1,3,5-triazines, 1,4-diazines, melamine, compounds derived from 2,3,5,6-tetraethylpiperazine, 1,4-piperazines or tetrathiafulvalenes. Mention is more particularly made of 2,4,6-tri(aminocaproic acid)-1,3,5-triazine (TACT).

According to a preferred embodiment, the polyfunctional compounds are chosen from 2,2,6,6-tetra(β-carboxyethyl) cyclohexanone, trimesic acid, 2,4,6-tri(aminocaproic acid)-1,3,5-triazine and 4-aminoethyl-1,8-octanediamine.

The mixture of monomers at the source of the star or H macromolecular chains of the invention can comprise other compounds, such as chain-limiting agents, catalysts or additives, such as light stabilizers, heat stabilizers or mattifying agents.

In this second embodiment of the invention, the composition comprises, as essential components, a conventional thermoplastic polymer, such as a polyamide or polyester, and a conducting additive as described above.

Mention may be made, as suitable thermoplastic polymers, of polyamide 6, polyamide 6,6, their blends and copolyamides, polyamide 12, polyethylene glycol, polypropylene glycol, polybutylene glycol, their blends and copolyesters.

As indicated above for the first embodiment, the composition can comprise other components conventionally used in the manufacture of strands or fibres, such as heat stabilizers, additives for improving the resistance of the polymer to ageing, such as UV stabilizers, pigments, colorants, mattifying agents or nucleating agents.

The nonwoven articles formed from the compositions made of thermoplastic polymers are produced by a conventional process consisting in extruding the molten polymeric composition through one or more spinnerets to form a collection of filaments. Such processes are disclosed in particular in U.S. Pat. Nos. 3,968,307, 4,052,146, 4,406,850, 4,424,257, 4,424,258, 4,830,904, 5,534,339, 5,783,503, 5,895,710, 6,074,590 and 6,207,276. The filaments are attenuated pneumatically and are deposited on a collecting surface in order to form a sheet. The bonding of the filaments of the sheet is carried out by any known means.

With the compositions of the invention, the filaments exiting from the spinnerets remain parallel to one another and can be deposited after attenuating on the surface in a homogeneous manner and with a uniform distribution. This is because no repulsion between the filaments is observed and thus no deviation from the direction of forward progression of the filaments is observed.

According to the invention, the filaments can exhibit highly varied cross-sectional shapes.

In addition, it is possible, without departing from the scope of the invention, to produce filaments made of different thermoplastic polymers, in particular two-component filaments. In this case, one of the thermoplastic polymers must be a polymer with a conducting nature in accordance with the invention.

Other advantages and details of the invention will become more clearly apparent in the light of the examples given below, purely by way of illustration and without any limiting nature, and in the light of the single FIGURE, which represents the device for determining the volume conductivity of the strands.

EXAMPLE 1

A polyamide PA 6,6 is manufactured by adding, in a polymerization reactor, 3149 g of dry Nylon Salt (salt obtained by stoichiometric reaction between one molecule of adipic acid and one molecule of hexamethylenediamine) to 2941 g of water with 0.21 g of pure copper acetate monohydrate powder, 7.56 g of potassium bromide powder with a purity of 99.5% by weight and 3.96 g of phenylphosphonic acid with a purity of 98% by weight.

This reaction mixture is heated up to 112° C.; the autogenous pressure of 1.2 bar absolute is subsequently regulated at this value by distillation of water during a concentrating step until a temperature of 120° C. is obtained.

The reaction mixture is subsequently heated up to 215° C. without distillation of water. At this temperature, the autogenous pressure reaches a value of 17.5 bar absolute and is regulated at this value by distillation of water during a step of distillation under pressure until a temperature of 230° C. is obtained. When the temperature of the reaction mixture reaches a value of 220° C. during this step of distillation under pressure, 13.6 g of a 5% by weight aqueous titanium dioxide suspension are added.

When the temperature of 230° C. is reached, the pressure is reduced to atmospheric pressure during a decompression step, at the end of which the temperature of the reaction mixture reaches the value of 275° C.

The reaction mixture is maintained at 275° C. in the finishing step for 10 minutes; the polymer is subsequently cast in the form of a lace, cooled and granulated by cutting the laces.

The viscosity number of the polymer A obtained, determined from the granules, is 140 ml/g. It is determined by the use of the ISO EN 307 standard method. The amine and acid terminal groups are respectively measured at 43 and 76 meq/kg by potentiometry in a trifluoroethanol/chloroform (50/50 by volume) solvent medium.

EXAMPLE 2

A conducting copolyamide in accordance with the first embodiment of the invention is manufactured using the procedure of Example 1 by additionally adding 3.57 g of pure adipic acid powder to the initial mixture of Nylon Salt and 77.59 g of a 70% by weight aqueous Jeffamine ED 2003 or XTJ-502 solution when the temperature of the reaction mixtures reaches a value of 260° C. during the decompression step. Furthermore, the duration of the finishing step is 45 minutes.

The viscosity number of the copolymer obtained, determined according to the method described in Example 1, is 139 ml/g. The amine and acid terminal groups are respectively measured at 43 and 77 meq/kg by potentiometry in a trifluoroethanol/chloroform solvent medium.

The copolymer B obtained comprises 2% by weight of repeat units corresponding to the general formula III, that is to say to the Jeffamine monomers.

EXAMPLE 3

The manufacturing process is repeated in an identical fashion to Example 2, in this case introducing 8.93 g of pure adipic acid powder and 193.98 g of a 20% by weight aqueous Jeffamine ED 2003 or XTJ-502 solution.

The viscosity number of the polymer is 125 ml/g. The amine and acid terminal groups are respectively measured at 50 and 85 meq/kg by potentiometry in a trifluoroethanol/chloroform solvent medium.

The copolymer C obtained comprises 5% by weight of repeat units corresponding to the general formula III, that is to say to the Jeffamine monomers.

EXAMPLE 4

Manufacture of a Modifying Polymeric Additive I

The reaction is carried out in a 7.5 litre autoclave. 1116.0 g of ε-caprolactam (9.86 mol), 57.6 g of 1,3,5-benzenetricarboxylic acid (0.27 mol), 1826.4 g of Jeffamine® M2070 (0.82 mol), 1.9 g of Ultranox® 236 and 3.5 g of a 50% (w/w) aqueous hypophosphorous acid solution are introduced into the reactor. The autoclave is purged with dry nitrogen. The reactor is maintained under gentle flushing with dry nitrogen.

The reaction mass is gradually heated from 20° C. to 200° C. The temperature of the reaction medium is subsequently brought to 250° C. This temperature is then maintained until the end of the reaction. After a stationary phase of one hour under these conditions, the system is gradually placed under vacuum to reach a pressure of 5 mbar and is then maintained under vacuum for an additional hour. The polymer is run out of the reactor into a mould.

Differential thermal analysis shows that the polymer obtained exhibits a melting peak at 205° C.

Characterization by steric exclusion chromatography (eluent: dimethylacetamide/0.1% LiBr) makes it possible to determine the weight-average molecular mass Mw and the number-average molecular mass Mn of the polymer (masses expressed with respect to polystyrene standards):
Mw=15 520 g/mol
Mn=10 960 g/mol.

Quantitative determinations of terminal groups show a content of residual acid functional groups of 16.8 meq/kg and of residual amine functional groups of 1.9 meq/kg.

$^1$H NMR (Bruker 300 MHz) of a solution in a 1/1 by weight mixture of deuterated trifluoroacetic acid and deuterated chloroform shows a residual caprolactam content of zero (undetectable) and a mean degree of polycondensation of the PA6 block of 8.4 per branch of the star. This additive is referred to as Additive I.

EXAMPLE 5

Manufacture of a Composition D in Accordance with the Invention

The procedure described in Example 2 is repeated. However, the pure adipic acid powder is not introduced. Furthermore, instead of the Jeffamine ED 2003 solution, in this case 271.2 g of a 20% by weight aqueous solution of the conducting additive I prepared according to Example 4 are introduced. The finishing time is 15 minutes.

The viscosity number of the composition thus obtained and thus of the thermoplastic polymer present in the composition, determined according to the method indicated above, is 149 ml/g. The amine and acid terminal groups are respectively measured at 39 and 71 meq/kg by potentiometry in a trifluoroethanol/chloroform solvent medium.

The composition D thus prepared comprises 2% by weight of conducting additive.

EXAMPLE 6

Manufacture of a Composition E in Accordance with the Invention

The manufacturing process is repeated in an identical fashion to Example 5, in this case 678 g of a 20% by weight aqueous solution of conducting additive I manufactured according to Example 4 being introduced. The finishing time is limited to 10 minutes.

The viscosity number of the composition thus obtained and thus of the thermoplastic polymer present in the composition, determined according to the method indicated above, is 152 ml/g. The amine and acid terminal groups are respectively measured at 40 and 71 meq/kg by potentiometry in a trifluoroethanol/chloroform solvent medium.

The composition E thus prepared comprises 5% by weight of conducting additive.

EXAMPLE 7

The compositions or polymers A, B, C, D and E manufactured in the above examples are respectively dried and then remelted at 295° C. and extruded through a spinneret at a rate of 450 m/min and a throughput by weight of 430 g/h to form filaments with a count of 12 dtex and are gathered together to form strands comprising 14 filaments. The strands are attenuated on an attenuation unit according to an attenuation ratio equal to 3.5 in order to result respectively in the strands recorded as 7a, 7b, 7c and 7d.

The volume conductivity of these strands is measured according to the following protocol:

Volume conductivity of textile strands is measured according to the "2 point" measurement method. Several strands are positioned in parallel over a given length between conducting contacts according to the scheme represented in the appended FIG. 1.

The measurement is carried out between two steel contacts 1 separated by 20 mm. The to-and-fro number of the strands is generally 5, i.e. 10 rows of strands in total (which corresponds exactly to 100 filaments, 1 strand being composed of 10 individual filaments). The diameter of the strand studied is measured beforehand using a binocular magnifier, its exact length being measured with callipers.

The measurements are carried out on a Keithley 617 conductivity meter with an applied voltage of 100 volts under temperature conditions of 20° C. and relative humidity conditions of 50%.

The volume electrical resistance is obtained by directly reading the device.

The volume resistivity p (unit: Ω.cm) is deduced from the preceding measurement by applying the following relationship:

$$\rho = \frac{R \cdot \pi \cdot d^2 \cdot n}{4 \cdot e}$$

where:
R=Volume electrical resistance (Ω)
d=Diameter of the strand (cm)
n=Total number of strands
e=Distance between the contacts (cm)

Finally, the volume conductivity σ (unit: $S.cm^{-1}$ or $\Omega^{-1}.cm^{-1}$) is exactly the inverse of the volume resistivity. The volume conductivity values found for these various strands are collated in the table below:

| Composition | Strand | Volume Conductivity (S/cm) |
|---|---|---|
| A | 7a | $0.1 \times 10^{-9}$ |
| B | 7b | $1.6 \times 10^{-9}$ |
| C | 7c | $19.5 \times 10^{-9}$ |

-continued

| Composition | Strand | Volume Conductivity (S/cm) |
|---|---|---|
| D | 7d | $1.5 \times 10^{-9}$ |
| E | 7e | $1.8 \times 10^{-9}$ |

When they are spun by a process for direct spinning/attenuation by air suction for the manufacture of nonwoven sheets, the polymers B and D make it possible to obtain satisfactory behaviour of the filaments in comparison with repellent behaviour of the filaments obtained by spinning the polymer A during the stage of deposition of the filaments as a sheet on a support surface, after the air attenuation device.

EXAMPLE 8

Manufacture of an Additive II in Accordance with the Invention

A copolymer based on polyamide 6,6 is manufactured from 240.2 g of a 64% by weight concentrated aqueous solution of a hexamethylenediammonium salt to which are added:
6 mg of antifoaming agent
12.945 g of Jeffamine ED 600 (sold by Huntsman)
3.453 g of adipic acid
0.345 g of acetic acid.

The polyamide is manufactured according to the standard polymerization process comprising a stage of concentrating the solution followed by a polycondensation stage in a stirred autoclave reactor, with a distillation step of approximately 47 min under a stationary pressure phase of 17.5 bar for which the final temperature is 250° C., a decompression step of approximately 36 min from 17.5 bar to 1 bar at a final temperature of 273° C. and a finishing step of approximately 20 min for which the final temperature is 272° C.

A copolymer based on PA 6,6 with a viscosity number of 73 ml/g is obtained.

EXAMPLE 9

Manufacture of an Additive III in Accordance with the Invention

A copolymer based on polyamide 6,6 is manufactured from 240.2 g of a 64% by weight concentrated aqueous solution of a hexamethylenediammonium salt to which are added:
5 mg of antifoaming agent
0.6962 g of hexamethylenediamine (32.4% by weight solution in water)
0.9216 g of adipic acid
0.345 g of 100% acetic acid.

The polyamide is manufactured according to the following process in a stirred autoclave reactor: a stage of concentrating the solution followed by a polycondensation stage, with a distillation step of approximately 47 min under a stationary phase at a pressure of 17.5 bar for which the final temperature is 250° C. The polymerization is continued by a decompression step from 17.5 bar to 1 bar which is interrupted at 10 bar in order to introduce 18.5 g of a 70% aqueous solution of Jeffamine ED 2003 (sold by Huntsman); the bulk temperature is maintained at 260° C. After this addition, the decompression is brought to completion, the decompression step lasts approximately 50 minutes, the final temperature is 272° C. The finishing step lasts approximately 20 min, the final temperature is 272.4° C.

A copolymer based on PA 6,6 with a viscosity number of 72 ml/g is obtained.

EXAMPLE 10

Tests on manufacturing fibres or strands were carried out using the additive-free polymer A of Example 1 in accordance with the invention and with different concentrations of the additives II and III described in Examples 8 and 9, as indicated in Table 1 below. In these examples, the additive II or III is added to the polymer A in a single-screw extruder and extruded in the form of a lace to form granules by cutting up the laces, according to known techniques.

The compositions or polymers thus obtained are respectively dried, then remelted at 295° C. and extruded through a spinneret comprising 34 holes with a diameter of 0.23 mm. The rate of the composition in the spinneret holes is 19.4 m/min. The filaments are cooled at the spinneret outlet by a cold air blower. The filaments are sucked into a suction system composed of an ejection gun commonly used in spinning processes. The filaments are discharged from this gun at a rate of 4000 m/min. The filaments are subjected to an attenuation ratio of approximately 200.

In order to monitor and determine whether the filaments exiting from the gun are electrostatically charged, the stream of filaments is directed vertically onto the surface of a target inclined at approximately 45° with respect to the vertical. The attachment of filaments to the surface of the target is an indication of the presence of electrostatic charges.

The electrostatic field present close to the stream of filaments exiting from the gun is also determined by positioning a static meter (device sold under the name Static Meter Model 212 by Electro-Tech Systems) at approximately 3 cm (1 inch) from the axis of the stream of filaments. This device is either connected to earth or is not connected to earth. Measurements are carried out in both configurations.

The absence of electrostatic charges is reflected by an electrostatic field in the vicinity of zero.

The results obtained with the compositions of the invention and an additive-free polyamide are shown in the table below:

| | Composition | | Static meter |
|---|---|---|---|
| Test | Base polymer | Modifying polymeric additive (% by weight) | result kV/inch |
| 10A comparative | Polymer A of Example 1 | | 6/10 |
| 10B | Polymer A of Example 1 | 5% of Additive II of Example 8 | 2/4 |
| 10C | Polymer A of Example 1 | 2% of Additive III of Example 9 | 1/3 |
| 10D | Polymer A of Example 1 | 5% of Additive III of Example 9 | −1/1.5 |
| 10E | Polymer A of Example 1 | 8% of Additive III of Example 9 | −1.5/0.5 |

In addition, no adhesion to the metal walls or to the surface of the target was observed for the tests of the invention, in contrast to the comparative test 10A.

The invention claimed is:
1. A process for the manufacture of nonwoven surfaces by direct melt spinning of filaments of a composition based on thermoplastic polymers comprising the steps of:
   a) feeding the composition to a plurality of spinnerets each comprising several spinning orifices, b) feeding the filaments to a pneumatic attenuation device and a stage in which the filaments obtained are formed into a sheet, wherein the composition based on thermoplastic polymers comprises a polymeric matrix and/or a modifying polymeric additive comprising repeat units corresponding to the following general formulae:

$$\mathrm{-\!\!\left[\!\!\begin{array}{c}C-R_1-C-N-R_2-N\\ \| \quad \| \quad H \quad \quad H \\ O \quad \quad O \end{array}\!\!\right]\!\!-} \qquad \mathrm{I}$$

$$\mathrm{-\!\!\left[\!\!\begin{array}{c}C-R_3-N\\ \| \quad \quad H \\ O \end{array}\!\!\right]\!\!-} \qquad \mathrm{II}$$

$$-[A-R_4-A-B-R_5-B]- \qquad \mathrm{III}$$

$$-[B-R_3-A-B-R_5-B-A-R_3]- \qquad \mathrm{IV}$$

in which:
- $R_1$, $R_2$, $R_3$ and $R_4$, which are identical or different, represent aliphatic, cycloaliphatic or aromatic hydrocarbon chains comprising from 2 to 18 carbon atoms,
- $R_5$ represents a polyether radical with a molecular weight of between 400 and 200 000,
- A and B represent the CO, NH or O groups; when A represents CO, B represents NH or O and vice versa, with the proviso that
(a) when the additive is absent, the polymeric matrix comprises at least one of the repeat units I or II and at least one of the repeat units III or IV;
(b) when the additive is present, the polymeric matrix comprises at least one of the repeat units I or II.

2. The process according to claim 1, wherein the modifying polymeric additive is present in the composition at a concentration by weight of between 1% and 30% of the total composition.

3. The process according to claim 2, wherein the modifying polymeric additive is present in the composition at a concentration by weight of between 1% and 15% of the total composition.

4. The process according to claim 1, wherein the modifying polymeric additive is obtained by polymerization of the monomers of following formulae:

$$\mathrm{HO-\underset{\underset{O}{\|}}{C}-R_1-\underset{\underset{O}{\|}}{C}-OH} \qquad (V)$$

$$\mathrm{H_2N-R_2-NH_2} \qquad (VI)$$

$$\mathrm{\overset{\frown}{\underset{\underset{O}{\|}}{C}-R_3-NH_2}} \qquad (VII)$$

$$\mathrm{B-R_5-B} \qquad (VIII)$$

in which:
- $R_1$, $R_2$ and $R_3$, which are identical or different, represent aliphatic, cycloaliphatic or aromatic hydrocarbon chains comprising from 2 to 18 carbon atoms,
- $R_5$ represents a polyether radical with a molecular weight of between 400 and 200 000,
- B represents the COOH, $NH_2$ or OH functional groups, in the presence of a monofunctional chain-limiting compound.

5. The process according to claim 4, wherein the chain-limiting agent is chosen from the group consisting of monofunctional acids and monofunctional amines.

6. The process according to claim 5, wherein the monofunctional compounds is acetic acid, propionic acid or benzylamine.

7. The process according to claim 4, wherein the monomer of formula VIII is present at a concentration by weight of between 1% and 20% in the mixture of monomers of formulae V and/or VI and/or VII and of monomers VIII.

8. The process according to claim 1, wherein the modifying polymeric additive is composed of: at least one thermoplastic block and at least one polyoxyalkylene block.

9. The process according to claim 1, wherein the modifying polymeric additive comprises:
at least one thermoplastic polymer block formed by:
a star or H macromolecular chain comprising at least one polyfunctional core and at least one branch or one segment of thermoplastic polymer connected to the core, the core comprising at least three identical reactive functional groups, and/or
a linear macromolecular chain comprising a difunctional core and at least one segment of thermoplastic polymer connected to the core, and
at least one polyoxyalkylene block connected to at least a portion of the reactive ends of the thermoplastic polymer block.

10. The process according to claim 9, wherein the bonding between the thermoplastic polymer blocks are:
at least one free end of the star or H macromolecular chain, chosen from the thermoplastic polymer branch or segment ends and the ends of the polyfunctional core, is connected to a poly(alkylene oxide) block, and/or
at least one free end of the linear macromolecular chain, chosen from the thermoplastic polymer segment ends and the ends of the difunctional core, is connected to a poly(alkylene oxide) block; the two free ends of the linear macromolecular chain being connected to poly(alkylene oxide) blocks when the thermoplastic polymer block comprises macromolecular chains solely of linear type.

11. The process according to claim 10, wherein the star macromolecular chain is a star polyamide obtained by copolymerization from a mixture of monomers comprising:
a polyfunctional compound comprising at least three identical reactive functional groups being an amine functional group or a carboxylic acid functional group,
monomers of following general formulae (Xa) and/or (Xb):

$$X-R_{12}-Y \qquad (Xa)$$

$$\mathrm{R_{12}-\underset{NH}{\overset{O}{\underset{\|}{C}}}} \qquad (Xb)$$

optionally, monomers of following general formula (IX):

$$Z-R_6-Z \qquad (IX)$$

in which:
Z represents a functional group identical to the reactive functional groups of the polyfunctional compound, $R_{12}$ and $R_6$ represent identical or different, substituted or unsubstituted, aliphatic, cycloaliphatic or aromatic hydrocarbon radicals which have from 2 to 20 carbon atoms and optionally having heteroatoms, Y is a primary amine functional group when X represents a carboxylic acid functional group, or Y is a carboxylic acid functional group when X represents a primary amine functional group.

12. The process according to claim 1, wherein the concentration by weight of repeat units of formula III and/or IV, when the polymeric matrix comprises them, is between 0.5 and 5% by weight of the said matrix.

13. The process according to claim 1, wherein the repeat units of formula III and/or IV originate from the reaction between a polyoxyalkylene monomer comprising two reactive terminal functional groups with a diacid monomer or a lactam.

14. The process according to claim 1, wherein the repeat unit of formula I is obtained by reaction between a diacid selected from the group consisting of succinic acid, adipic acid, terephthalic acid, isophthalic acid, dodecanedioic acid and their mixtures and a diamine selected from the group consisting of hexamethylenediamine, 2-methylpentamethylenediamine and meta-xylylenediamine.

15. The process according to claim 1, wherein the repeat unit of formula II is obtained by polycondensation of lactams or amino acids selected from the group consisting of caprolactam, aminoundecanoic acid and aminododecanoic acid.

* * * * *

UNITED STATES PATENT AND TRADEMARK OFFICE
CERTIFICATE OF CORRECTION

PATENT NO. : 8,557,170 B2
APPLICATION NO. : 10/586770
DATED : October 15, 2013
INVENTOR(S) : Roland Durand et al.

It is certified that error appears in the above-identified patent and that said Letters Patent is hereby corrected as shown below:

Title page, item 75 (Inventors): Please replace "Lyons" with "Lyon", and "Saint Baudille de la Tour" with "Sainte Baudille de la Tour".

Section 75 should then state:

Roland Durand, Saint Bonnet de Mure (FR); Bertrand Bordes, Lyon (FR); Matthieu Helft, Oullins (FR); Caroll Vergelati, Sainte Baudille de la Tour (FR)

Signed and Sealed this
Seventeenth Day of December, 2013

Margaret A. Focarino
*Commissioner for Patents of the United States Patent and Trademark Office*